United States Patent
Buchholz et al.

(10) Patent No.: US 9,807,975 B2
(45) Date of Patent: Nov. 7, 2017

(54) DEVICE FOR PRODUCING MILK FOAM (71) Applicant: Melitta SystemService GmbH & Co. KG, Minden (DE)

(72) Inventors: Bernd Buchholz, Rahden (DE); Thomas Diester, Bueckeburg (DE)

(73) Assignee: MELITTA PROFESSIONAL COFFEE SOLUTIONS GMBH & CO. KG, Minden (DE)

( * ) Notice: Subject to any disclaimer, the term of this patent is extended or adjusted under 35 U.S.C. 154(b) by 116 days.

(21) Appl. No.: 14/264,977

(22) Filed: Apr. 29, 2014

(65) Prior Publication Data
US 2014/0322415 A1 Oct. 30, 2014

(30) Foreign Application Priority Data

Apr. 29, 2013 (DE) .......................... 10 2013 104 338

(51) Int. Cl.
*A01J 11/00* (2006.01)
*A01J 11/04* (2006.01)
(Continued)

(52) U.S. Cl.
CPC .................. *A01J 11/04* (2013.01); *A23C 7/00* (2013.01); *A47J 31/4485* (2013.01)

(58) Field of Classification Search
CPC ........ A01J 11/04; A23C 7/00; A23C 2210/30; A47J 31/4485; A47J 31/40; A47J 31/405; A47J 31/4489; A47J 31/46
(Continued)

(56) References Cited

U.S. PATENT DOCUMENTS 3,728,129 A 4/1973 Sargeant
6,006,654 A 12/1999 Pugh
(Continued)

FOREIGN PATENT DOCUMENTS

CA 2843345 A1 2/2013
CH 685597 A5 8/1995
(Continued)

OTHER PUBLICATIONS

English Translation for DE102006023450 published Nov. 2007.
(Continued)

*Primary Examiner* — Quang D Thanh
*Assistant Examiner* — Brandon Harvey
(74) *Attorney, Agent, or Firm* — FisherBroyles, LLP; Robert Kinberg (57) ABSTRACT

A device for processing milk foam for use in an automatic hot and/or cold beverage machine includes a milk pump to pump the milk foam, and a secondary processing device coupled to the milk foam pump to change the consistency of the milk foam. The secondary processing device includes a homogenizer to break up and distribute air bubbles in the milk foam. The homogenizer has a reducing region including a plurality of impact bodies arranged to define a channel labyrinth through which the milk foam is flowable. Additionally, there is provided a process for homogenizing milk foam utilizing the above device, includes steps of a) impacting divided partial flows of the milk foam with the impact surfaces to divide the air bubbles of the milk foam; and b) mixing the divided partial flows with the divided air bubbles together to form new partial flows.

13 Claims, 6 Drawing Sheets (51) Int. Cl.
*A23C 7/00* (2006.01)
*A47J 31/44* (2006.01)

(58) Field of Classification Search
USPC .......................................... 99/452, 453, 454
See application file for complete search history.

(56) References Cited

U.S. PATENT DOCUMENTS

| | | | |
|---|---|---|---|
| 6,681,685 B2 * | 1/2004 | Mahlich | A47J 31/4485 99/293 |
| 6,713,110 B2 | 3/2004 | Imboden | |
| 7,097,074 B2 | 8/2006 | Halliday | |
| 7,231,869 B2 | 6/2007 | Halliday | |
| 7,255,039 B2 | 8/2007 | Halliday | |
| 7,316,178 B2 | 1/2008 | Halliday | |
| 7,328,651 B2 | 2/2008 | Halliday | |
| 7,507,430 B2 | 3/2009 | Steams | |
| 7,592,027 B2 | 9/2009 | Halliday | |
| 7,595,470 B1 | 9/2009 | Sizer | |
| 7,607,385 B2 | 10/2009 | Halliday | |
| 8,371,477 B2 | 2/2013 | Klopfenstein | |
| 8,444,016 B2 | 5/2013 | Lussi | |
| 8,657,262 B2 * | 2/2014 | Burri | A47J 31/4485 261/26 |
| 8,820,577 B2 | 9/2014 | Rusch | |
| 2005/0233040 A1 | 10/2005 | Ehrfeld et al. | |
| 2007/0048428 A1 * | 3/2007 | Green | A47J 43/12 426/564 |
| 2007/0272317 A1 | 11/2007 | Klopfenstein | |
| 2008/0050496 A1 * | 2/2008 | Boldor | B01F 3/0865 426/569 |
| 2008/0295699 A1 | 12/2008 | Duineveld | |
| 2009/0068331 A1 | 3/2009 | Muheim | |
| 2009/0087532 A1 | 4/2009 | Meier | |
| 2009/0293733 A1 | 12/2009 | Martin | |
| 2010/0126354 A1 * | 5/2010 | Mahlich | A47J 31/3671 99/293 |
| 2010/0273273 A1 | 10/2010 | Cross | |
| 2011/0070349 A1 * | 3/2011 | Burri | A47J 31/4485 426/474 |
| 2013/0280403 A1 | 10/2013 | Reyhanloo | |
| 2015/0020691 A1 | 1/2015 | Midden | |

FOREIGN PATENT DOCUMENTS

| | | |
|---|---|---|
| DE | 4213895 A1 | 11/1992 |
| DE | 19719784 C1 | 7/1998 |
| DE | 102006023450 A1 | 11/2007 |
| EP | 0600826 A1 | 6/1994 |
| EP | 1312292 A1 | 5/2003 |
| EP | 1785074 A1 | 5/2007 |
| EP | 2036472 A2 | 3/2009 |
| EP | 2042063 A1 | 4/2009 |
| EP | 2471423 A1 | 7/2012 |
| WO | 03/086601 A1 | 10/2003 |

OTHER PUBLICATIONS

English Translation for DE19719784 published Jul. 1998.
EP Search Report, dated Aug. 20, 2014, for related EP Application No. 14164131.

* cited by examiner

DEVICE FOR PRODUCING MILK FOAM

CROSS REFERENCE TO RELATED APPLICATIONS

This application claims priority to German Patent Application No. 102013 104 338.0, filed Apr. 29, 2013, which is hereby incorporated herein by reference in its entirety.

BACKGROUND OF THE INVENTION

The invention relates to a device for producing milk foam, and to a process for generating the milk foam.

Numerous examples for producing milk foam, meaning a mixture of milk and air and, if applicable, also water, are known from the prior art. As a rule, they involve an automatic coffee machine. With known automatic coffee machines, the consistency of the milk foam, above all the forming of the air bubbles, is frequently irregular.

SUMMARY OF THE INVENTION

It is an object of the invention to provide a process and a device for generating milk foam which will reduce the aforementioned problem.

The above and other objects are achieved according to the invention, wherein according to one aspect of the invention there is provided a device for processing milk foam for use in an automatic hot and/or cold beverage machine, which in one embodiment includes: a milk pump to pump the milk foam; and a secondary processing device coupled to the milk foam pump to change the consistency of the milk foam; the secondary processing device including a homogenizer to break up and distribute air bubbles in the milk foam, the homogenizer having a reducing region including a plurality of impact bodies arranged to define a channel labyrinth through which the milk foam is flowable.

According to a further aspect of the invention there is provided a process for homogenizing milk foam with an homogenizer having a reducing region including a plurality of impact bodies arranged to define a channel labyrinth through which the milk foam is flowable in a plurality of divided partial flows, the process including in one embodiment the steps of: a) impacting the divided partial flows of the milk foam with the impact surfaces to divide the air bubbles of the milk foam; and b) mixing the divided partial flows with the divided air bubbles together to form new partial flows.

According to an embodiment, a homogenizer is provided for a secondary treatment of the milk foam which is intended to reduce the air bubbles in the milk foam, within the meaning of an air/milk emulsion and/or an air/milk mixture. An air/milk mixture of this type comprises a defined amount of milk to which a defined amount of air is supplied. Optionally, such an air/milk mixture additionally contains a defined amount of (hot) steam (water). The consistency of milk foam may be optimized with the homogenizer. In particular, the consistency of the milk foam may be changed from fine, meaning with extremely small air bubbles, to rough, meaning with large air bubbles, as well as from fluffy, to creamy, to solid by varying the pressure at the intake.

The homogenizer may be included in an automatic hot beverage device, especially for an automatic coffee machine. The homogenizer may include a reduction region with therein arranged numerous impact bodies. A labyrinth of channels through which the milk/air mixture flows extends between these impact bodies.

The milk/air mixture may be pumped in the form of partial flows through the channel labyrinth. For this purpose, several impact bodies are may be arranged side-by-side in a row. According to an embodiment, the impact bodies may be respectively provided with an impact surface with which partial milk foam flows impact when flowing through the channel labyrinth. Upon impact, the partial flows are divided and the air bubbles are broken up, thereby resulting in smaller air bubbles.

According to an embodiment, the homogenizer may include several rows of impact bodies, arranged one below the other, in an extension direction which is also the flow direction for the milk foam. As a result, the partial flows respectively impact with the impact bodies of the rows, arranged one below the other in the extension direction, so that the air bubbles are reduced multiple times.

The several impact bodies of the same row may be spaced apart, so that a channel is formed between them. According to an embodiment, the several impact bodies of adjacent rows may be arranged offset to each other. The impact surfaces of the impact bodies in one row may therefore be respectively arranged in the extension direction below the channel which is arranged between two adjacent impact bodies in the same, above-arranged row, as seen in extension direction. A channel of this type consequently allows parts of the two partial flows to converge, which arrive at the impact surfaces of the channel-delimiting impact bodies. In each channel, parts of these partial flows are mixed together and a new partial flow is respectively formed.

According to an embodiment, the impact bodies of adjacent rows may be offset in the center. As a result, the channels always extend respectively in the center of the impact bodies for the adjacent upper and/or lower row. With this embodiment, a new partial flow is formed with approximately half of each of the two partial flows which arrive at the impact surfaces of the delimiting impact bodies.

According to an embodiment, the impact space connects the channel between two impact bodies of the upper row extending in the extension direction with the two channels of the lower row in the extension direction, which adjoin the impact body having an impact surface below the impact region. As a result, the partial flows that flow through the channels are divided in the impact region, and divided partial flows are mixed together again in the immediately following channels.

The impact bodies may be tapered toward the lower end, for example triangle-shaped, as seen in the extension direction. The impact region can thus be cleaned easily and the depositing of dirt is prevented.

According to one embodiment, the homogenizer extends concentrically around an axis. With this type of embodiment, the milk/air mixture can flow uniformly distributed around the axis into the homogenizer. As a result, approximately equally large partial flows are formed when the milk foam flows into the channels formed between the impact bodies. This embodiment is furthermore space saving and requires only a single intake opening. Depending on the structural space available, however, a homogenizer extending along a plane or with a different design may be employed.

When using a homogenizer that extends concentrically around the axis, several impact bodies in each row are advantageously arranged in a circumferential direction and uniformly distributed around the axis, wherein there may be an equal number of impact bodies in each row, so that the partial flows are homogenized uniformly.

According to one embodiment, the homogenizer may be tapered in the direction of extension, which will facilitate a tight fit with the aid of a clean tapered seat and also enable acceleration of the speed of the milk foam flowing through the channel labyrinth. For that reason, the homogenizer may have a conical shape in the size reduction region. At an upper, wider end of the size reduction region, as seen in extension direction, large air bubbles are thus broken up during the impact with the impact surfaces. At the lower, smaller end in the extension direction of the size reduction region, smaller air bubbles are also broken up because of the acceleration of the milk/air mixture, as well as the reduced surface ratio.

The milk/air mixture is furthermore continuously remixed in extension direction of the homogenizer. The intensity of the homogenization can therefore be adjusted by selecting the length of the homogenizer.

According to an embodiment, the homogenizer may have an intake area embodied in the manner of a truncated cone that is expanded in the extension direction, thereby resulting in a ramp with the milk/air mixture being distributed uniformly in the circumferential direction of the ramp. When flowing into the reduction region, the partial flows therefore always carry approximately the same amount of milk foam. The milk/air mixture thus is always homogenized quite uniformly and has a uniform consistency.

According to an embodiment, the homogenizer may include an outlet or dispensing area where it has a truncated-cone shaped and is tapered in the extension direction. As a result, the milk/air mixture in the outlet area is again accelerated. The homogenized milk/air mixture may be dispensed from the homogenizer without backpressure.

The homogenizing of the milk foam may be realized on the one hand by a stronger mixing together of the air bubbles with the milk, meaning because the milk/air mixture is divided into partial flows and these are mixed together once more. On the other hand, the air bubbles are simultaneously broken up in that the partial flows hit the impact surfaces with impact energy.

The homogenizer may form a component of a secondary processing device for a milk/air mixture in which a secondary processing of the milk foam and in particular a final processing takes place. For this, a cold milk/air mixture as well as a warm milk/air mixture can be processed in the secondary processing device. In principle, the secondary processing device can also be arranged upstream of a device for heating the milk foam.

The housing for the secondary processing device may include an upper housing part and a lower housing part. The homogenizer may be arranged in the lower housing part.

According to an embodiment, homogenizer may be arranged form-fittingly inside the lower housing part. With this design, the pressure is utilized which is exerted by the milk foam onto the homogenizer when it flows into the secondary processing device. With a tapered form of the homogenizer and a correspondingly embodied lower housing part, the homogenizer is centered in the lower housing part as a result of the pressure and is pressed against an inside wall of the lower housing part. The inside wall of the housing and the homogenizer may be embodied to match, so that the homogenizer is arranged with a press-fit against the inside of the housing wall. Owing to this press-fit, the milk/air mixture cannot flow between the housing inside wall and the homogenizer.

The secondary processing device may form a component of a device for generating milk foam. The device for generating milk foam furthermore may comprise a milk pump for pumping the milk foam.

In an embodiment, the amount of the milk foam pumped by the milk pump can be varied to allow changing the consistency of the milk foam depending on the desired hot beverage. As a result of the changed amount, the pressure is changed with which the milk/air mixture flows into the secondary processing device. The pressure at which the milk/air mixture flows into the secondary processing device and the flow speed of the milk foam is high if a large amount is pumped by the milk pump and the pressure is low for a small amount pumped by the milk pump. As a result, the energy at which the partial flows respectively impact with the impact surfaces is that much greater with an increase in the pumped amount and/or is that much smaller with a decrease in the pumped amount. On the other hand, the milk/air mixture is pushed faster through the homogenizer if the amount increases and slower if the pumped amount decreases.

It has turned out that with an unchanged ratio of milk to supplied air, an increase in the pumped milk/air mixture results in a milk foam with extremely uniform properties (with unchanged feed parameters, in particular pressure), wherein these can be changed by varying the feed pressure. However, the foam in each case has a uniform consistency.

The secondary processing device may be arranged in the flow direction of the milk foam behind a device for heating up the milk foam. As a result, the consistency of the milk foam, which may have changed because of the heating, can be adjusted or changed a final time with the aid of the secondary processing device. The heating up of the milk foam is optional.

The milk foam can be heated up, for example, with the aid of a steam supplying device which supplies hot steam to heat up the milk/air mixture. In principle, however, other devices for heating up the milk foam can also be used.

It has turned out that the final processing with the homogenizer, which takes into account the amount of milk foam that is pumped with the milk pump and the change in the milk foam caused by the heating device, creates a broad adjustment range in which the consistency can be adjusted reproducibly, wherein the quality of the milk foam is quite good and wherein the temperature of the milk foam can be selected from a broad temperature range.

According to an aspect of the invention, an automatic hot and/or cold beverage machine may in include such a device for generating milk foam. In an embodiment, the hot and/or cold beverage machine may be an automatic coffee machine. However, the invention can also be used for other hot and/or cold beverage machines, for example an automatic tea or cocoa maker, or an automatic machine serving a combination thereof. The use of the device for generating milk foam is a hot and/or cold beverage machine of this type permits the production of milk/air mixtures with different, reproducible consistency and varying temperature, depending on the selected hot and/or cold beverage.

According to a further aspect of the invention, there is provided a process for homogenizing milk foam with the aid of a homogenizer in a secondary processing device, in particular a device for generating milk foam for which the milk/air mixture is pumped in partial flows through a channel labyrinth, which includes the steps of:
  respectively impacting the partial flows of the milk foam with impact surfaces, causing the partial flows as well as the air bubbles in the milk foam to break up, and
  remixing the divided partial flows to form new partial flows.

In the process, respectively adjacent partial flows are mixed together once they impact with the impact surface.

The milk/air mixture may be accelerated when it flows through the channel labyrinth. As a result, even small air bubbles can still be broken up.

The milk/air mixture may flow with a defined volume into the homogenizer. Different consistencies for the milk foam can thus be achieved with the same homogenizer.

The consistency of the milk foam can be adapted with this process, wherein milk foam ranging from a mousse-type consistency to a solid consistency can be produced, depending on the adjusted volume flow.

BRIEF DESCRIPTION OF THE DRAWINGS

The invention is described in further detail in the following with the aid of an exemplary embodiment and with reference to the drawing, showing in.

DETAILED DESCRIPTION

Figure 1:
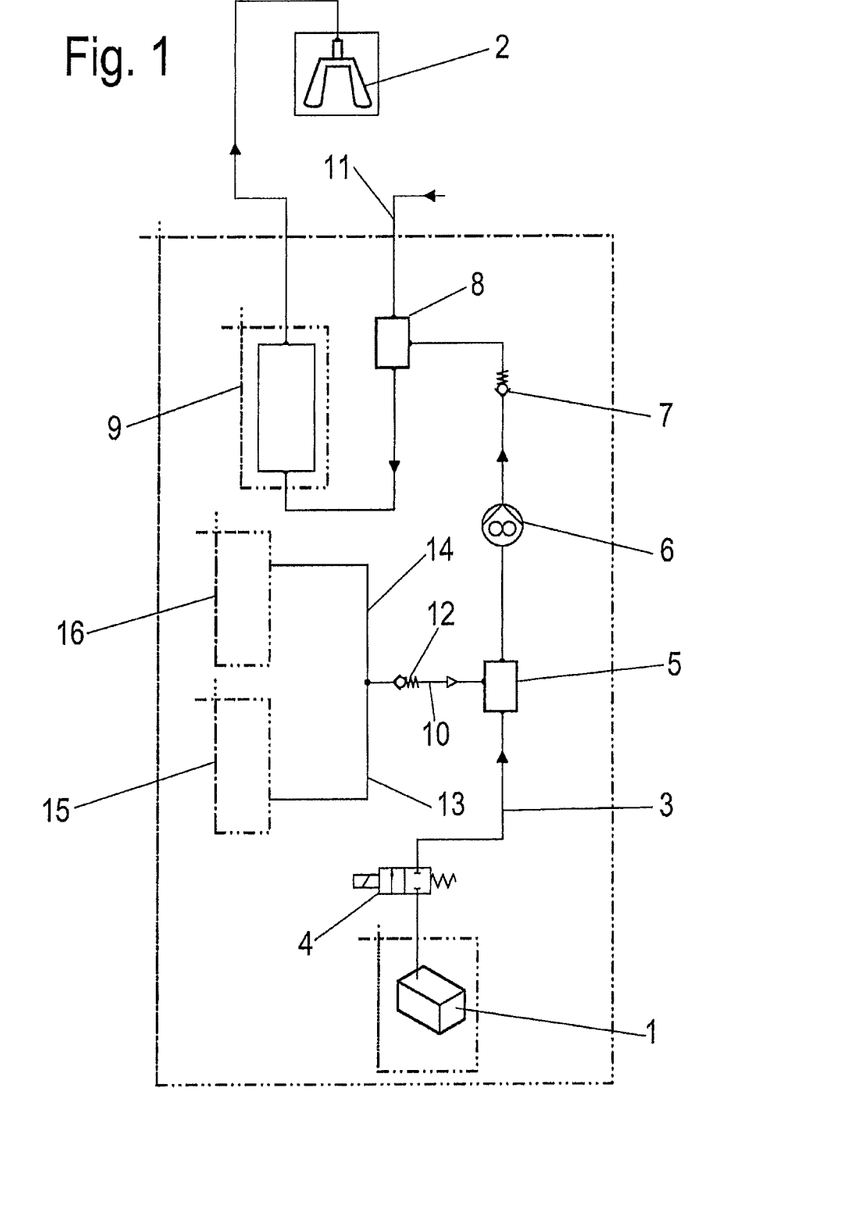
FIG. 1 A schematic in block diagram form representing a device for the foaming of milk according to the invention.

FIG. 1 shows a device for generating milk foam. The terms milk/air mixture and milk foam, as well as air/milk emulsion, are used synonymously in the following. The device advantageously has the following design.

A milk line 3 connects a milk container 1 and a dispensing device 2, wherein this dispensing device 2 is embodied as an outlet. In the following, the terms dispensing device 2 and outlet are used synonymously. The following components are installed in the same sequence in the milk line 3, extending between the milk container 1 and the outlet 2: a shut-off valve 4, a first mixing chamber 5, a milk pump 6, a first backpressure valve 7, a second mixing chamber 8 and a secondary treatment device 9.

A feed line 10 with therein installed second backpressure valve 12 furthermore empties into the first mixing chamber 5, wherein the feed line 10 is divided in front of the backpressure valve 12 into two branch lines 13, 14.

Both branch lines 13, 14 are connected to an air source 15, 16 (an opening to the atmosphere, an air pump, or a pressure container or the like).

A steam feed line 11 furthermore empties into the second mixing chamber 8 though hot steam from a hot-steam source (not shown herein) can be conducted into the milk line 3.

The device functions as follows. With the aid of the milk pump 6, installed in the milk line 3, milk (for example, milk with a fat content of less than 10%, preferably less than 7.5%) is pumped from the milk container 1 to the outlet 2, wherein the milk may be pumped continuously for the duration of the milk foam production.

The shut-off valve 4 in this case is initially switched from the closed position, shown herein, to the flow-through position.

The milk is then pumped from the milk container 1 into and through the first mixing chamber 5. In the first mixing chamber 5, embodied in the simplest form, for example, in the manner of a T-section with a mixing chamber region having a larger diameter (not shown herein), air is supplied to the milk flowing through the milk line 3, such that the milk and inflowing air are mixed into a foam-type milk/air mixture 40 and/or form an air/milk emulsion. The milk/air mixture 40 takes the form of an emulsion, so that air bubbles 41 are occluded in the milk.

Devices such as a shut-off valve, one or several chokes and/or the like may be installed in the branch line 10, so that the supply of air can be defined, started and interrupted. A fixed choke offers the advantage that a precisely defined amount of air can always be fed in. Chokes are known per se to one skilled in the art and are therefore not shown further herein. It is conceivable to alternately switch between two chokes and/or choke arrangements for feeding the air (especially for cold or warm milk products).

A constant amount of air may be suctioned continuously into the milk flowing through the first mixing chamber 5 during the milk foam production, so as to produce a milk/air mixture 40 with uniform properties, if possible.

The milk/air mixture 40 produced in the first mixing chamber 5 is pumped with the milk pump 6 and is condensed or concentrated therein, wherein a milk pump 6 with adjustable pumping capacity may be used.

The condensed milk/air mixture 40, which flows out of the milk pump 6 and continues on, is then pumped through a section containing the second mixing chamber 8. In the second mixing chamber 8, for example embodied as a T-section, hot steam optionally flows from the line 11 into the milk/air mixture 40, so as to increase the temperature of the milk/air mixture and generate heated milk foam 40. The amount of inflowing hot steam remains constant in this case. However, it is also conceivable to change this amount, so that the degree of heating up the milk foam 40 can be adapted.

Adjoining the second mixing chamber 8 is a decompression section for the milk line 3 which empties into the secondary treatment device 9.

The heated milk/air mixture 40, flowing out of the second mixing chamber 8 and the decompression section, could already be released to a container, but that is not the case here. Rather, the mixture is first processed once more in the secondary processing device 9, to purposely change the foam quality.

The secondary processing device 9 preferably comprises a homogenizer 95, designed to homogenize the milk foam 40, so that the air bubbles are broken up and are distributed more uniformly throughout the milk. This secondary treatment initially is realized such that the milk foam 40, as well as the air bubbles 41, impact at least once or repeatedly with impact surfaces 971 (see FIG. 3a-3c).

The type and intensity of the secondary treatment in this case depends in particular on the pumping capacity and/or the speed of the milk pump 6, meaning on the pressure of the milk pump 6 for pumping the milk foam 40 into the secondary treatment device 9. The properties of the milk foam can thus be influenced substantially via the pumping capacity of the milk pump 6 in order to generate different foam qualities (for example relating to the bubble size) which are particularly suitable for different specialty coffees, such as cappuccino or milk coffee or the like.

From the secondary treatment device 9, the homogenized milk foam 40 is then discharged through outlet or dispenser 2 into a container (not shown), for example into a cup.

Milk foam 40 which is produced continuously, so-to-speak, during the operation has an adjustable foam consistency. Milk foams having different consistencies can thus be produced according to the invention, ranging from very fine (with extremely small air bubbles 41) to rough (with large air bubbles 41 by comparison) and further ranging from fluffy to creamy to solid.

Figure 2A:
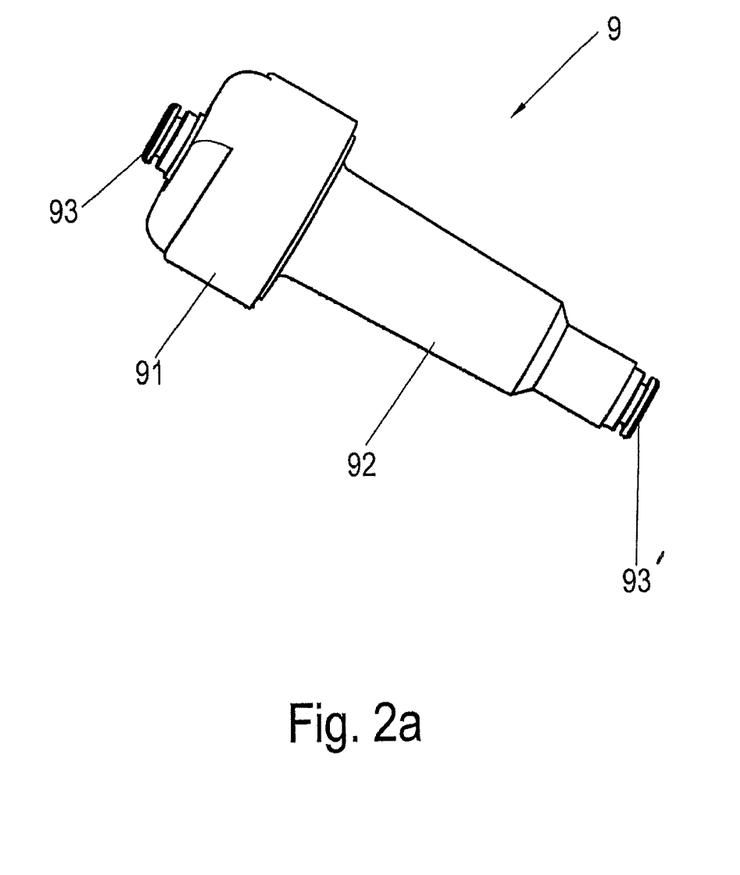
FIGS. 2a-2d A secondary treatment device shown schematically in FIG. 1 for changing the consistency of the milk foam illustrated, respectively in a perspective view in FIG. 2a, a side view in FIG. 2b, a cross section in FIG. 2c and an exploded view in FIG. 2d.
Figure 2B:
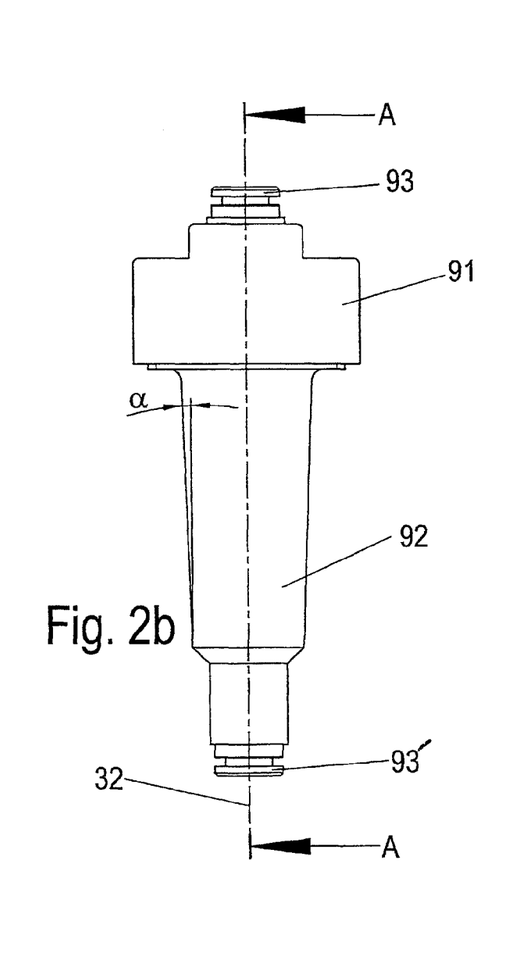
Figure 2C:
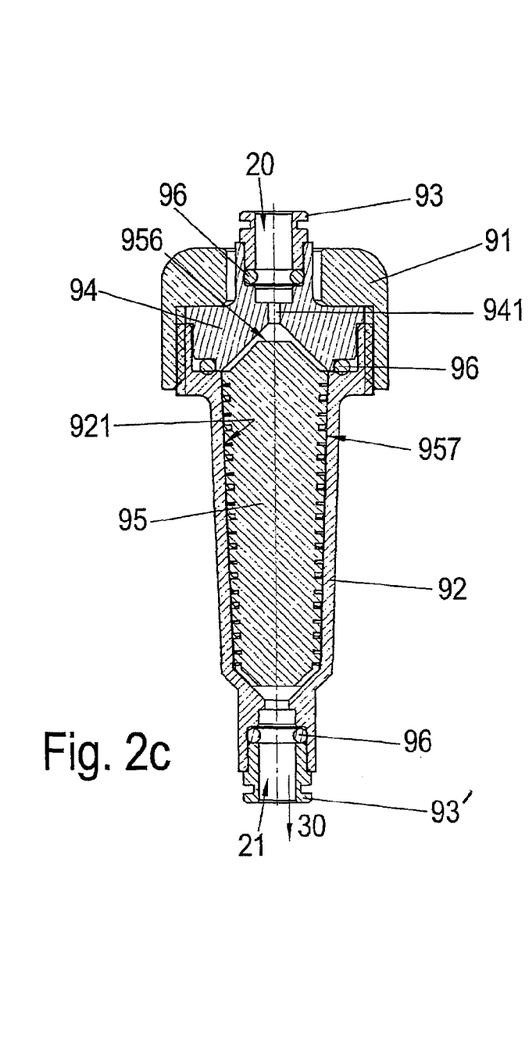

FIGS. 2a-2d provide various views of the secondary treatment device 9. FIG. 2 (a) shows a perspective view; FIG. 2(b) shows a view from the side; FIG. 2(c) shows a section A-A through the representation in FIG. 2(b); and FIG. 2(d) contains an enlarged, exploded view.

The secondary treatment device 9 comprises a housing which extends concentrically around an axis 32 and is formed with an upper housing part 91 and a lower housing part 92, wherein the homogenizer 95 is arranged in the lower housing part 92. A top section 94 with a nozzle 941 is provided in the upper housing part 91. The upper housing part 91 and the top section 94 contain a through bore (not given a reference), wherein a connecting insert 93 is provided in the top part 94 which functions as inlet opening 20 for the milk/air mixture 40. The milk/air mixture 40 flows through the inlet opening 20 and the nozzle 941 to the homogenizer 95.

Owing to the pressure exerted by the milk/air mixture 40 onto the homogenizer 95, the homogenizer is pressed against an inside wall 921 of the lower housing part 92. The homogenizer 95 has a conical shape that is tapered in extension direction 30. It has an outside wall 957 with an angle α of approximately 1°-5°, preferably 2°, relative to the axis 32, thereby achieving a good sealing effect. In addition, the milk/air mixture 40 is accelerated while flowing through the homogenizer 95.

The lower housing part 92 and its inside wall 921 are furthermore embodied to match the shape of the homogenizer 95, meaning they are also conically shaped. As a result, the homogenizer 95 is centered by the pressure exerted by the milk/air mixture 40 and is pressed against the housing inside wall 921, so that it fits form-locking against it. The milk/air mixture 40 therefore cannot flow between the housing inside wall 921 and the outside wall of the homogenizer 957.

The outside wall 957 of the homogenizer 95 is interspersed with a channel labyrinth 98 (see FIGS. 3a-3c) through which the milk/air mixture is pushed. In the process, it is homogenized, meaning the air bubbles in the milk/air mixture 40 are broken up and distributed uniformly in the milk/air mixture 40.

Figure 2D:
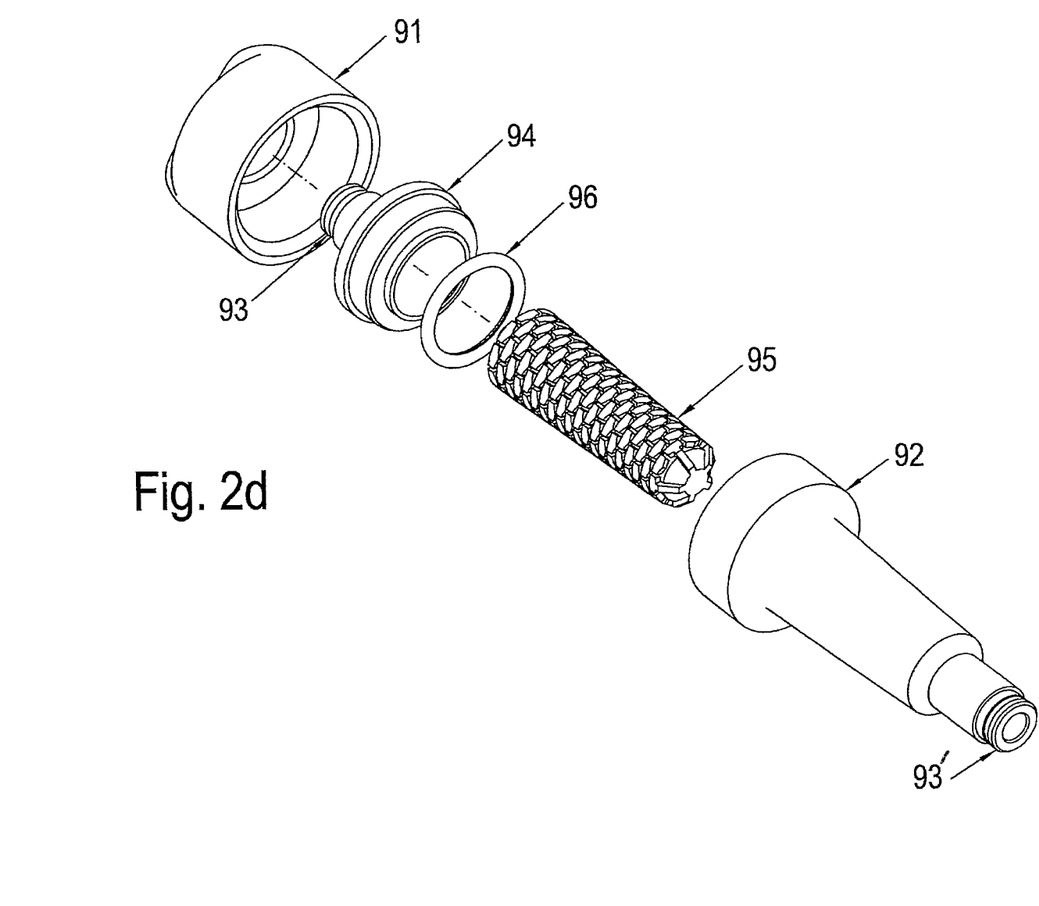

Once the homogenized milk/air mixture 40 has flown through the homogenizer 95 it is discharged from the secondary treatment device 9 through an outlet 21 in a connecting insert 93' that is arranged in a through bore (not given a reference) in the lower housing part 92 as shown in FIGS. 2c and 2d.

The connecting insert 93 on the inlet side is sealed against the upper part 94, the upper part 94 is sealed against the lower housing part 92, and the outlet side connecting insert 93' is sealed against the lower housing part 92 with sealing rings 96, so that the milk/air mixture 40 cannot escape into the intermediate spaces (not given a reference) of the secondary treatment device 9.

Figure 3A:
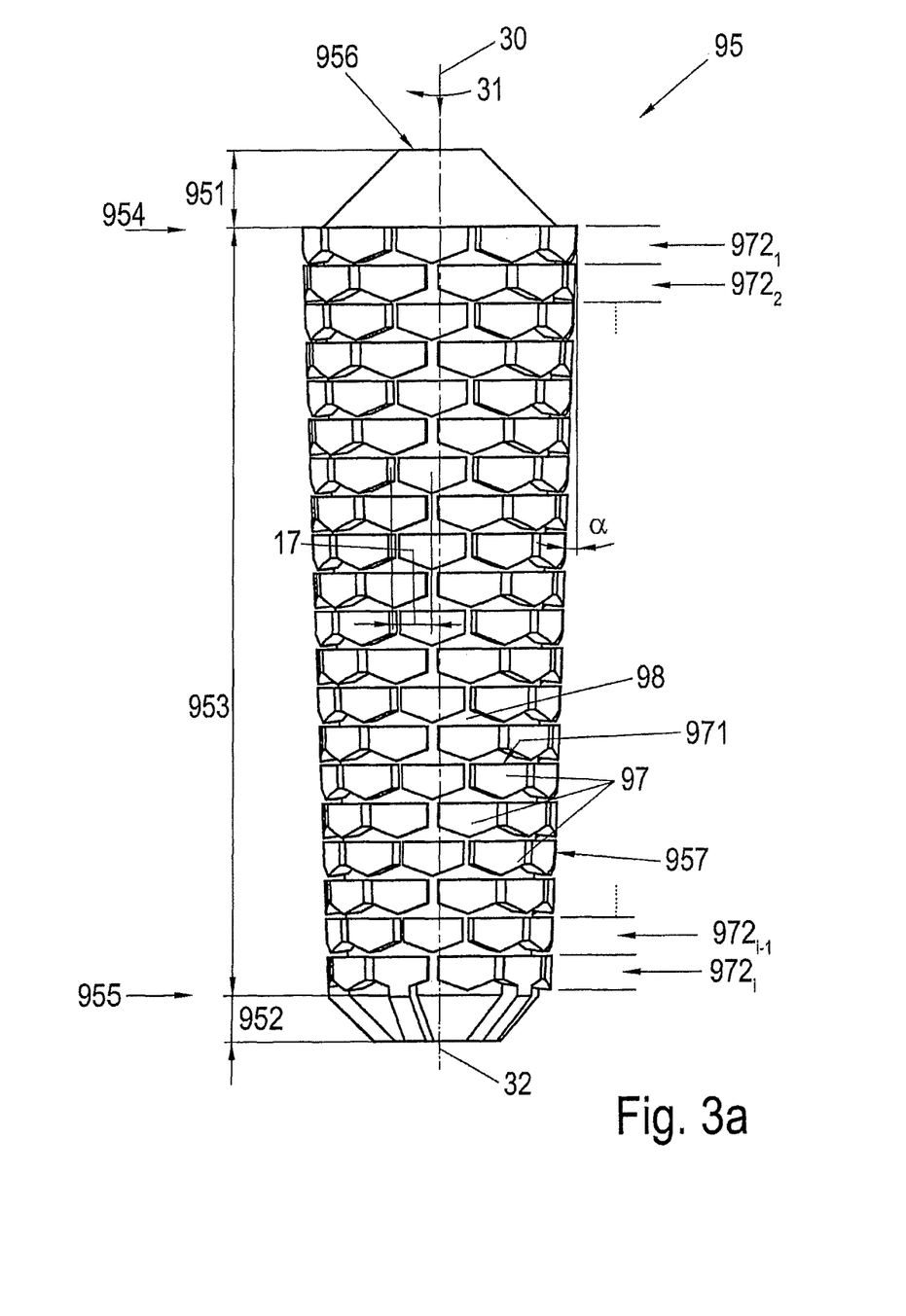
FIGS. 3a-3c A homogenizer used in the secondary treatment device shown in FIG. 2, illustrated in a detailed side view in FIG. 3a, and respective detail views of FIG. 3a in FIGS. 3b and 3c.
Figure 3B:
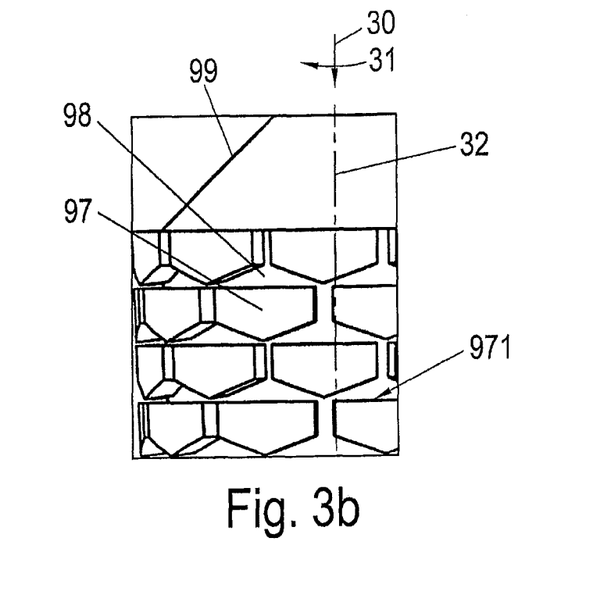
Figure 3C:
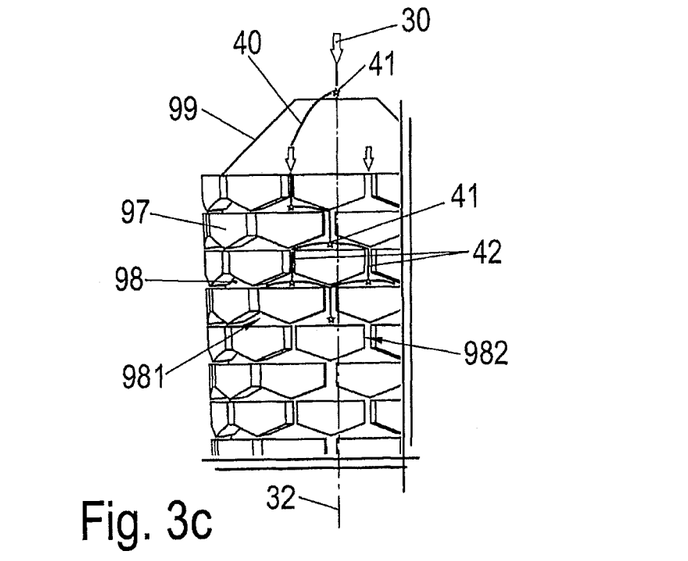

FIGS. 3a-3c show in 3a a detailed view from the side of the homogenizer and in 3b and 3c respective details of the homogenizer according to FIG. 3a.

The homogenizer 95 has an inlet region 951, which is embodied as a truncated cone and is therefore conically expanded in the extension direction 30. On the inlet side, the milk/air mixture during intake impacts an entrance surface 956 which makes an obtuse angle with a ramp 99 formed by the conical shape (FIGS. 3a, 3b). The milk/air mixture 40 is then distributed uniformly in the circumferential direction 31 around the ramp 99 formed by the conical shape.

A reduction region 953 adjoins the inlet region 951. The reduction region 953 comprises the outside wall 957 which is interspersed with the channel labyrinth 98 and is also shaped conically, but is tapered in extension direction 30.

The reduction region 953 is followed by an outlet region 952 where the homogenizer 95 has a truncated cone shape and is tapered further in extension direction 30.

In the reduction region 953, impact bodies 97 are provided between which the channel labyrinth 98 extends. The individual impact bodies 97 have impact surfaces 971 with which the partial flows 42 of the milk foam 40 impact while flowing through the channel labyrinth 98. On a side located opposite the impact surface 971, meaning the lower side of the impact bodies 97 in extension direction 30, the impact bodies are respectively tapered. In the embodiment shown herein, the impact bodies 97 have a triangular shape.

Several impact bodies 97 are respectively arranged side-by-side in rows $972_1$, $972_2$-$972_i$, distributed evenly in the circumferential direction 31. Several lower rows $972_1$, $972_2$-$972_i$ with impact bodies 97, arranged one below the other, are furthermore also provided in the extension direction 30. The impact bodies 97 of same rows $972_1$, $972_2$-$972_i$ are respectively spaced apart, so that a channel 982 is formed between them. In addition, the impact bodies 97 of the rows $972_1$, $972_2$-$972_i$ are respectively offset relative to each other in the center, wherein this offset is indicated by double arrow 17. As a result, the impact surface 971 of an impact body 97 is always arranged below a channel 982.

An approximately triangle-shaped impact region 981 is furthermore formed in this way above each impact body 97 which connects the channel 982 above the impact surface 971 of the impact body 97 with the two channels 982 that adjoin the impact body 97 on the side.

The channel labyrinth 98 comprises therefore a plurality of impact regions 981 which are connected by the channels 982.

A milk/air mixture 40 that flows through the secondary processing device 9, enters the channel labyrinth 98 on the inlet end 954 of the reduction region 953 through the upper row $972_1$ of the impact bodies 97 in the extension direction 30. In the process, the milk/air mixture is divided into approximately equally large partial flows 42 which flow through respectively one of the channels 982 of the upper row $972_1$.

The partial flows 42 respectively impact with the lower impact surface 971 that is arranged below the channel 982, wherein not only the partial flows 42 are divided but also the air bubbles 41. The divided partial flows 42 then respectively flow through the channels 982, arranged on the side of the impact bodies 97 with which they impact. In the process, they are mixed with the respectively adjacent divided partial flows 42, to form a new partial flow 42 that flows through the channel 982. Subsequently, this partial flow impacts with the following impact surface 971 of the row $972_1$, $972_2$-$972_i$ that follows in extension direction 30 and is divided, wherein the air bubbles 41 are divided once more. This operation is repeated until the milk/air mixture 40 has flown through the last, lower row $972_i$ of the homogenizer 95 at its lower, outlet-side end 955.

In the outlet region 952 and when flowing out through the opening 21, the homogenized partial flows 42 converge once more.

The partial flows 42 are pushed at high pressure through the channel labyrinth 98. The pressure depends on the pumping capacity of the milk pump 6 and can be adjusted via this pump. The air bubbles 41 hit the impact surface 971 with a high enough energy so that they divided upon impact. Owing to the conical shape of the homogenizer 95, the surface ratios are reduced and the partial flows 42 are accelerated. As a result, the impact energy is sufficiently high, even at the lower end 955 in extension direction 30, to break up small air bubbles 41 during impact.

When flowing through the homogenizer 95, the milk/air mixture 40 is therefore homogenized since the air bubbles 41 continue to be reduced, so that the individual bubble sizes conform to each other and the milk/air mixture 40 continues to be mixed.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A device for processing milk foam for use in an automatic hot and/or cold beverage machine, comprising:
    a first mixing chamber having an input for admitting air from a supply of air, an input for admitting milk from a milk supply and an output, the first mixing chamber mixing the air and the milk to produce the milk foam at the output;
    a milk pump in fluid communication with the first mixing chamber to pump the milk foam; and
    a secondary processing device in fluid communication with the milk foam pump to change a consistency of the milk foam, the secondary processing device including a flow through direction and a homogenizer to break up and distribute air bubbles in the milk foam, the homogenizer comprising:
        an inlet region to receive the milk foam and having a shape of a truncated cone that is expanded in the flow-through direction, the truncated cone having a top surface with a circumference and that makes an obtuse angle with a conically shaped side surface of the truncated cone, wherein the milk foam entering the inlet region impacts the top surface and is distributed uniformly around the circumference to the conically shaped side surface;
        a reducing region adjoining the inlet region and including a plurality of impact bodies arranged to define a channel labyrinth through which the milk foam is flowable in divided partial flows in the flow-through direction of the secondary processing device, the reducing region being tapered in the flow-through direction; and
        an outlet region adjoining the reducing region in a downstream direction and having a shape of a truncated cone that is further tapered in the flow-through direction relative to the reducing region.

2. The device according to claim 1, wherein the impact bodies respectively include an impact surface which is hit by at least one of the partial flows of the milk foam that flows through the channel labyrinth.

3. The device according claim 1, wherein the impact bodies are respectively arranged in rows, one below the other, in an extension direction of the homogenizer which is the flow-through direction for the milk foam.

4. The device according to claim 3, wherein the impact bodies of adjacent rows are arranged offset relative to each other.

5. The device according to claim 3, wherein the impact bodies of a row are arranged spaced apart from one another.

6. The device according to claim 3, wherein the homogenizer extends concentrically around an axis so that the impact bodies of each row are respectively arranged and distributed uniformly in a circumferential direction around the axis.

7. The device according to claim 1, wherein the impact bodies have lower ends that are tapered in the flow-through direction.

8. The device according to claim 1, wherein the secondary processing device comprises a lower housing part in which the homogenizer is arranged form-locking.

9. An automatic hot and/or cold beverage machine comprising the device for generating milk foam according to claim 1.

10. A process for homogenizing milk foam in a device according to claim 2, comprising:
    a) impacting the divided partial flows of the milk foam with the impact surfaces to divide the air bubbles of the milk foam; and
    b) mixing the divided partial flows with the divided air bubbles together to form new partial flows.

11. The process according to claim 10, including mixing respectively adjacent divided partial flows together following the impacting with the impact surfaces.

12. The process according to claim 10, including accelerating the milk foam while flowing through the channel labyrinth.

13. The device according to claim 1, wherein the milk pump has a variable capacity which is adjustable to change a pressure of the milk foam in the homogenizer for adjusting the consistency of the milk foam produced by the homogenizer.

* * * * *